Aug. 12, 1941.    W. D. VAN OS    2,252,222
DEVICE FOR DETECTING LOOSE METAL PARTS IN
THE OILING SYSTEMS OF POWER PLANTS
Filed Oct. 3, 1938
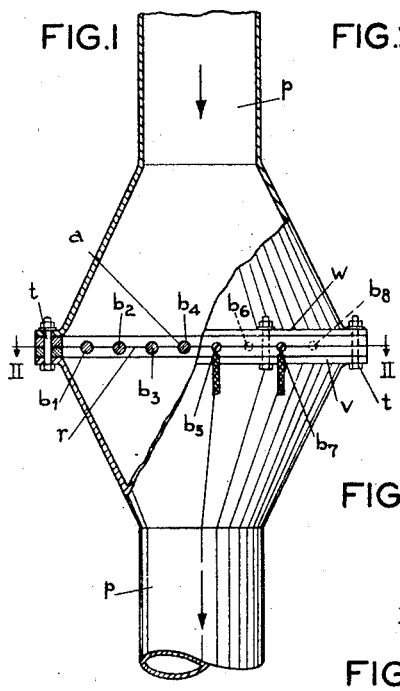
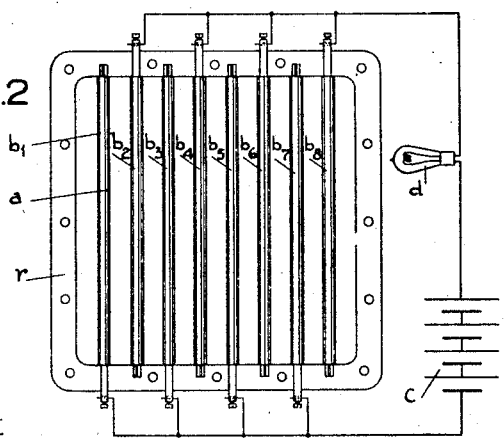
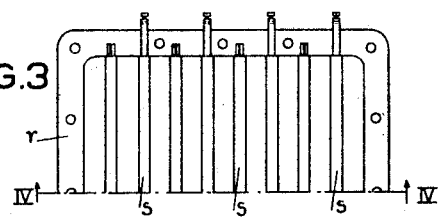
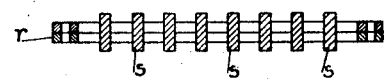
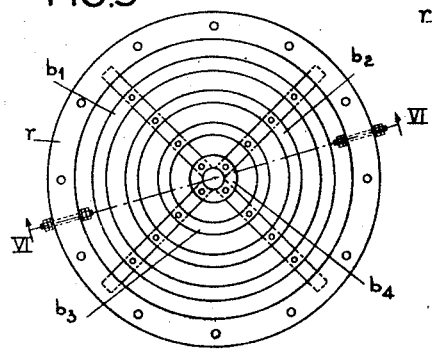
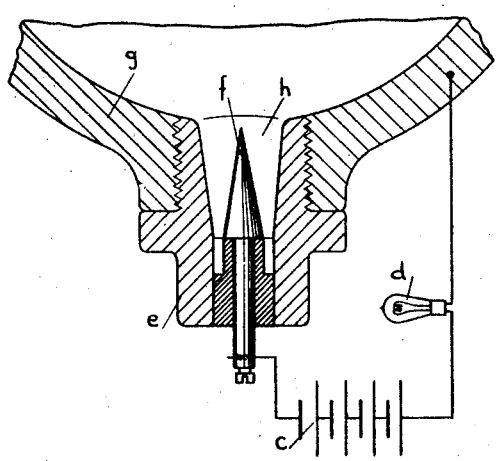
Willem Dirk van Os
Inventor Patented Aug. 12, 1941

2,252,222

UNITED STATES PATENT OFFICE 2,252,222

DEVICE FOR DETECTING LOOSE METAL PARTS IN THE OILING SYSTEMS OF POWER PLANTS

Willem Dirk van Os, Bad Hoevedorp, Netherlands

Application October 3, 1938, Serial No. 233,089
In the Netherlands July 12, 1938

5 Claims.   (Cl. 200—52)

This invention relates to a device for detecting loose metal parts in the oiling system of power plants. The invention relates more particularly to a device of this kind for use in internal combustion motors for instance for aeroplanes.

An object of my invention is to provide a device for detecting in the oiling system of a combustion motor metal particles, such as may originate from one of the internal parts of the motor which generally show that there is something the matter with the motor. Such metal parts may be injurious for the motor and may lead to disturbance or serious damage of the plant.

If a device according to the invention is provided the operator is warned and may take corrective measures in time.

A further object of the invention is to provide a device of the kind referred to which permanently watches the plant, permits controlling the oil system permanently at any desired time and place for loose and injurious metal parts without interrupting the operation of the power plant, such that for checking the condition of the oil, the power plant need not be stopped and rendered accessible during the checking operation, which as a rule causes that a large quantity of oil gets lost.

It is a further object of the invention to provide a device for detecting loose metallic particles in a power plant, which is simple in construction, safe in operation and may easily be mounted in combustion engines of all sorts.

A still further object of the invention is to provide a system which distinguishes between very small particles such as particles originating from the normal wear of the inner motor parts and larger particles originating from any defect or particles which might lead to damage.

With the above and other objects in view the invention consists in a device embodying the novel and improved features, constructions and combination of parts hereinafter described and particularly pointed out in the claims, the advantages will be readily understood and appreciated by those skilled in the art.

In the drawing:

Figure 1 is an embodiment of the invention partly in section, the electric circuit being omitted;

Figure 2 is a section of the arrangement according to Figure 1 along the line II—II, showing also the outer circuit arrangement;

Figure 3 is a similar view as Figure 2 of another embodiment;

Figure 4 is a section of Figure 3 along the line IV—IV;

Figure 5 is a modification of the arrangement according to Figures 1-4;

Figure 6 is a diametrical section of Figure 5 along the line VI—VI;

Figure 7 is a section of a third embodiment of the invention showing also the outer circuit.

Figures 1 and 2 show an embodiment of the invention, in which there is a grate or grid $a$ consisting of a number of cylindrical rods $b$ of which the odd numbers $b_1$, $b_3$, $b_5$, etc., are connected with one pole of the electric generator $c$, whilst the even numbers $b_2$, $b_4$, $b_6$, etc., are connected across a warning lamp $d$ or another type of warning device with the other pole. Hence the one set of rods constitutes one terminal and the other set another terminal or electrode of an electric circuit. The grate system is arranged in an enlarged cross section of an oil pipe $p$. The rods $b$ are connected to a frame $r$, which is bolted by means of bolts $t$ between two flanges $w$ and $v$ of the pipe $p$.

The distance between the rods $b$ is selected according to the admissible dimensions of the loose and injurious metal parts and is preferably of the order of 1 to 2 mm. In the drawing for clearness' sake this distance has been shown on an enlarged scale. Preferably, the grate $a$ is arranged horizontally, the oil being guided in downward direction through the grate, thus increasing the chance of a better contact being made between two or more rods by the loose metal parts. Owing to the metal parts making contact between the terminals, the circuit is closed and the warning lamp $d$ lights up. Figures 3 and 4 show an embodiment in which the grate is constructed from strips S of rectangular section.

A third embodiment is represented in Figures 5 and 6. The difference between this embodiment and those according to Figures 1-4 consists in that the grid is constituted of a number of rings, the even numbers of said rings being connected with each other and forming one terminal of an outer circuit as shown in Figure 2. The odd numerals form the other terminal. The distance between two successive rings may again be of the order of 1 to 2 mm.

A further and preferred embodiment is shown in Figure 7, in which the grate of rods as such is replaced by a plug $e$ and a central core $f$ insulated therefrom, each of which is connected with one pole of the electric generator $c$, a lamp or other warning device being connected up in one of the leads. The said plug e is mounted at the lowest point of the oiling system, whilst the walls g in the immediate vicinity of this plug e are funnel-shaped, so that the loose and injurious parts find their way, with an appreciable degree of certainty, into the pointed funnel-shaped space h, where they are firmly caught, and by making contact between the core j and the plug e, render the warning device d operative.

The funnel-shaped space has a ring-shaped cross-section. In practice the thickness of this ring varies from 1 to 1.5 mm.

The fine particles which are not injurious can accumulate in the annular space j which is covered on at least one side with insulating material.

It will be understood that instead of a lamp as indicated in Figures 2 and 7 any other indicating device, such as an electric meter or a bell may be used.

It is to be understood that the invention is not limited to the particular constructions and arrangements of parts of the illustrated embodiments of the invention but that the invention may be embodied in other forms within the scope of the claims.

Having explained the nature and objects of my invention and having specifically described constructions embodying the invention, what I claim is:

1. A device for completing an electric circuit in response to loose metal parts in the oiling system of a power plant, said device comprising terminals arranged near the lowest point of the oiling system at a place where metal particles contained in the oil will settle by gravity, the terminals being placed at such a distance from each other that metal parts of a predetermined size will bridge them, thereby electrically connecting said terminals together.

2. A device for completing an electric circuit in response to loose metal parts in the oiling system of a power plant, comprising terminals arranged concentrically with respect to each other at a place within the system where metal particles contained in the oil will settle, the terminals being placed at such a distance from each other that metal parts of a predetermined size will bridge them, thereby electrically connecting said terminals together.

3. A device for completing an electric circuit in response to loose metal parts in the oiling system of a power plant, comprising a pair of electrodes arranged concentrically with respect to each other at a place within the system where metal particles contained in the oil will deposit themselves, the electrodes being placed at such a distance from each other that metal parts of a predetermined size will bridge them, thereby electrically connecting said electrodes together, the central electrode being tapered so that a funnel-shaped space is provided between the two electrodes.

4. A device for completing an electric circuit in response to loose metal parts in the oiling system of a power plant, comprising a pair of electrodes arranged concentrically with respect to each other at a place within the system where metal particles contained in the oil will deposit themselves, the electrodes being placed at such a distance from each other that metal parts of a predetermined size will bridge them, thereby electrically connecting said electrodes together, the central electrode being tapered so that a funnel-shaped space is provided between the two electrodes, said funnel-shaped space terminating in a substantially cylindrical space of which at least one cylindrical wall is of insulating material.

5. A device for completing an electric circuit in response to loose metal parts in the oiling system of a power plant, comprising a pair of electrodes arranged concentrically with respect to each other at a place within the system where metal particles contained in the oil will deposit themselves, the electrodes being placed at such a distance from each other that metal parts of a predetermined size will bridge them, thereby electrically connecting said electrodes together, the outer electrode of the concentric electrodes being provided with a threaded portion such that it may be screwed into a corresponding opening of the oiling system.

WILLEM DIRK VAN OS.